United States Patent
Collet et al.

(10) Patent No.: US 8,005,973 B2
(45) Date of Patent: Aug. 23, 2011

(54) METHOD AND SYSTEM FOR PLAYING VIDEO ON A MOBILE DEVICE

(75) Inventors: Jean-Luc Collet, La Gaude (FR); Francois-Xavier Drouet, La Gaude (FR); Gerard Marmigere, Drap (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 12/560,539

(22) Filed: Sep. 16, 2009

(65) Prior Publication Data

US 2010/0077039 A1 Mar. 25, 2010

(30) Foreign Application Priority Data

Sep. 22, 2008 (EP) .................................... 08305576

(51) Int. Cl.
*G06F 15/16* (2006.01)
(52) U.S. Cl. .................. 709/231; 709/224; 709/203
(58) Field of Classification Search .................. 709/231, 709/236, 223–224, 203
See application file for complete search history.

(56) References Cited

U.S. PATENT DOCUMENTS

| 7,170,938 | B1 * | 1/2007 | Cote et al. ................ 375/240.03 |
| 7,405,752 | B2 * | 7/2008 | Kondo et al. .............. 455/456.1 |
| 7,571,246 | B2 * | 8/2009 | Virdi et al. .................... 709/232 |
| 2004/0177378 | A1 | 9/2004 | Cool |
| 2006/0126583 | A1 * | 6/2006 | Markel et al. ................ 370/338 |

FOREIGN PATENT DOCUMENTS

| EP | 1670249 A2 | 6/2006 |
| WO | 2005112393 A1 | 11/2005 |

OTHER PUBLICATIONS

PCT, "Notification of Transmittal of the International Search Report and the Written Opinion of the International Searching Authority, or the Declaration", International Application No. PCT/EP2009/060873, Dated Nov. 4, 2009.

* cited by examiner

*Primary Examiner* — Philip B Tran
(74) *Attorney, Agent, or Firm* — Douglas A. Lashmit; Hoffman Warnick LLC

(57) ABSTRACT

The invention provides a system and a method for automatically switching from a local storage to a remote storage for recording a broadcast video stream, the switching being triggered by the fact that the local storage is almost full, and for automatically switching from a local storage to a remote storage for playing a broadcast video stream in a delayed manner, the switching being triggered by the fact that the video frames in the local storage are exhausted.

7 Claims, 9 Drawing Sheets

METHOD AND SYSTEM FOR PLAYING VIDEO ON A MOBILE DEVICE

FIELD OF THE INVENTION

The present invention relates to a method and system for playing a broadcasted video stream on a mobile device.

RELATED ART

Broadcast mobile TV technology complements existing operator networks, optimizing capacity and quality. It offers consumers the chance to enjoy high quality terrestrial digital broadcasts along with voice telephony and internet access, all in a single wireless device. Broadcast mobile TV will offer new business opportunities for mobile service providers, content and broadcast companies, infrastructure and handset manufacturers, as well as technology providers.

IP Datacast over DVB-H (Digital Video Broadcast for Handheld) is an end-to-end broadcast system for the delivery of any type of digital content and services using IP-based mechanisms optimized for devices with limitations on computational resources and battery. An inherent part of the IPDC (IP Datacast) system is that it comprises an unidirectional DVB broadcast path that may be combined with a bidirectional mobile/cellular interactivity path. IPDC is thus a platform that can be used for enabling the convergence of services from broadcast/media and telecommunications domains (e.g., mobile/cellular).

The IPDC file delivery method is based on the FLUTE protocol. FLUTE (File Delivery over Unidirectional Transport) shall be used for this function. In addition to the basic delivery protocol, the proposed file delivery solution comprises other parts that further specify how FLUTE is used. The purpose of file delivery is to deliver content in files.

SUMMARY OF THE INVENTION

According to a first aspect of the present invention, there is provided a method for playing video frames, each of the frames being associated with a numeric identifier, the method comprising: receiving a first frame associated with a first identifier from a first input stream associated with a broadcast server; storing the first frame in a first queue; detecting a first event when a dequeuing of video frames from the first queue is halted; detecting a second event when the first queue load is above a first predefined threshold; sending a first message to an output message handler, the first message instructing a recording of the video frames from the broadcast server in a second external queue, the second external queue being hosted on an external server; receiving a second message indicating that a second frame associated with a second identifier has been stored in the second external queue; detecting a third event when dequeuing of video frames from the first queue has started; and sending a third message to the output message handler instructing the external server to stream the previously recorded video frames.

An advantage of this aspect is that the method detects when the local queue is almost full and automatically instructs the remote server with additional storage to take over the recording from that point, without the need of further user interaction. Another advantage of this aspect is that a delayed playback of a broadcast stream is made possible, by buffering either in the local queue or in the remote queue the video frames with are broadcasted with the video playing is paused. Yet another advantage of this aspect is that the playback can dequeue video frames from the local queue, and when it is almost empty, switch automatically onto the external queue, without further intervention from the user.

In a first development of the first aspect, at the step of sending a third message, the video frames sent by the personal server are associated with a further identifier having a numeric value greater than or equal to the numeric value of the second identifier.

An advantage is that the external server streams only the video frames which are actually required.

In a second development of the first aspect, after the step of receiving a second message, the video frames whose associated identifier has a numeric value greater than or equal to the numeric value of the second identifier are discarded.

An advantage is that the load of the local queue is kept to a minimum.

In a third development of the first aspect, the method further comprises the step of receiving a third frame associated with a third identifier from the second input stream.

An advantage is that the video frames stored in the external server are streamed to the local video player.

In a fourth development of the first aspect, the method further comprises the step of detecting a fourth event when the first queue load is below a second predefined threshold.

An advantage is that it is possible to switch from the local storage to the remote storage for video playback in an optimized manner.

According to a second aspect of the present invention, there is provided an apparatus for playing video frames, each of the frames being associated with a numeric identifier, comprising: a component for receiving a first frame associated with a first identifier from a first input stream associated with a broadcast server; a component for storing the first frame in a first queue; a component for detecting a first event when the dequeuing of video frames from the first queue is halted; detecting a second event when the first queue load is above a first predefined threshold; a component for sending a first message to an output message handler, the first message instructing the recording of the video frames from the broadcast server in a second external queue, the second external queue being hosted on an external server; a component for receiving a second message indicating that a second frame associated with a second identifier has been stored in the second external queue; a component for detecting a third event when dequeuing of video frames from the first queue has started; and a component for sending a third message to the output message handler instructing the external server to stream the previously recorded video frames.

An advantage is that this apparatus can be obtained very easily, thus making the method easy to execute.

According to a third aspect of the present invention, there is provided computer program product stored on a computer readable storage medium and loadable into the internal memory of a computing device, comprising software code portions for performing, when said product is run on a computer, the steps of: receiving a first frame associated with a first identifier from a first input stream associated with a broadcast server; storing the first frame in a first queue; detecting a first event when the dequeuing of video frames from the first queue is halted; detecting a second event when the first queue load is above a first predefined threshold; sending a first message to an output message handler, the first message instructing the recording of the video frames from the broadcast server in a second external queue, the second external queue being hosted on an external server; receiving a second message indicating that a second frame associated with a second identifier has been stored in the second external queue; detecting a third event when dequeuing of video frames from the first queue has started; and sending a third message to the output message handler instructing the external server to stream the previously recorded video frames.

An advantage is that the invention can easily be reproduced and run on different computer systems.

Further advantages of the present invention will become clear to the skilled person upon examination of the drawings and detailed description. It is intended that any additional advantages be incorporating therein.

BRIEF DESCRIPTION OF THE DRAWINGS

Embodiments of the present invention will now be described by way of example with reference to the accompanying drawings in which like references denote similar elements.

DETAILED DESCRIPTION OF THE INVENTION

Figure 1:
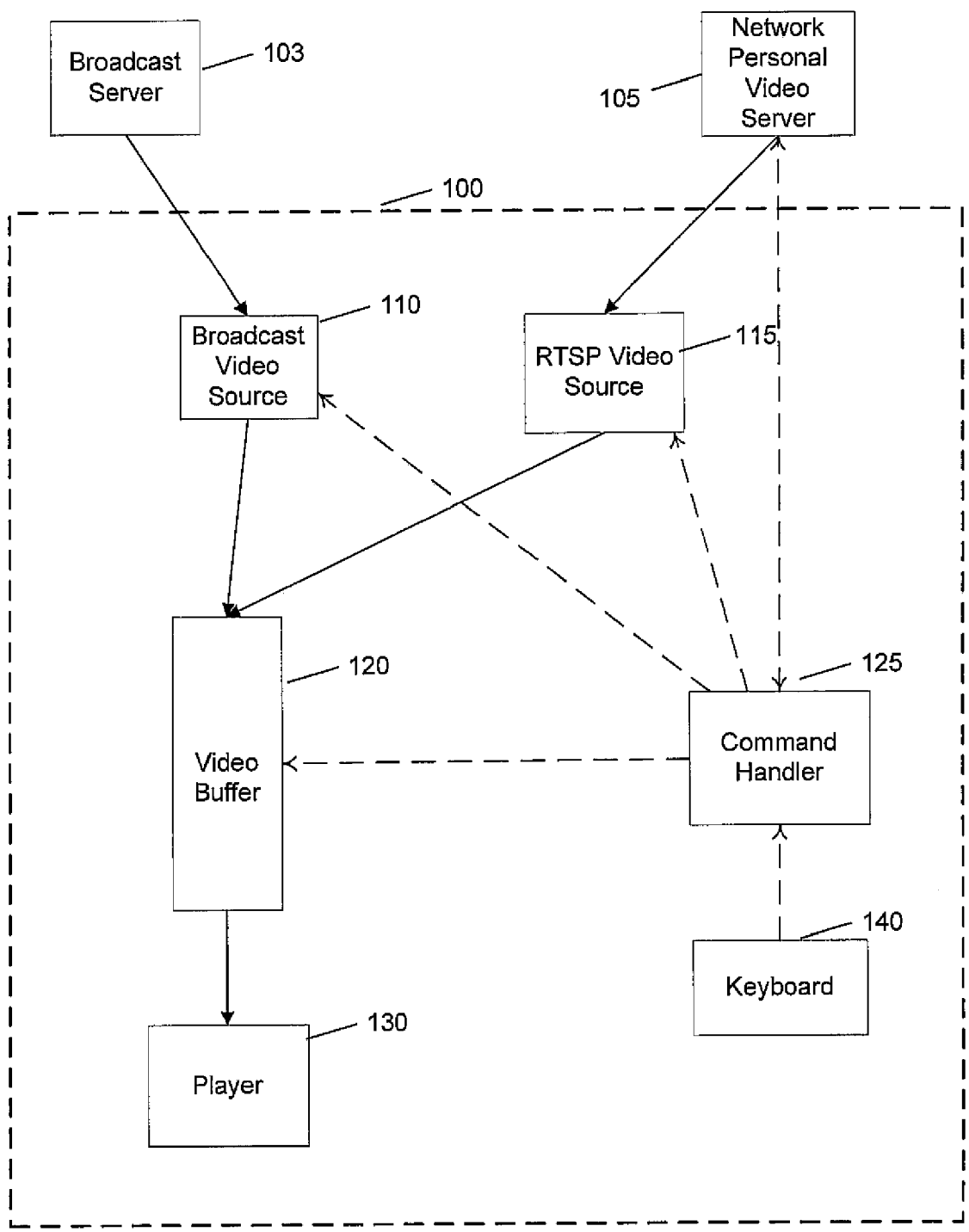
FIG. 1 shows a system in which the present invention can be implemented.

FIG. 1 shows a system in which the present invention can be implemented. The system comprises: a portable computing system (100) adapted for connecting to a network; a broadcast server (103) broadcasting video frames on a network; and a network personal video server (105) adapted for connecting to a network, for recording and streaming video frames.

The portable computing system (100) comprises: a broadcast video source (110) for connecting to a stream of broadcasted video frames; a real time streaming protocol (RTSP) video source (115) for receiving a stream of video frames; a video buffer (120) for storing video frames; a command handler (125) for sending RTSP commands to remotely control a streaming media server and for sending commands to other components of the portable computing system; a player (130) for playing video frames; and a keyboard (140) for receiving inputs from a user.

The portable computing system (100) can connect to a network where video frames are broadcasted by the broadcast server (103). The portable computing system (100) can also connect to the network personal video server (105) to receive streamed video frames with the RTSP video source (115). The portable computing system (100) sends and receives commands to and from the network personal video server (105) by means of the command handler (125) component. The broadcast video source (110) receives broadcasted video frames from the network. The video buffer (120) collects video frames received in the broadcast video source (110) or the RTSP video source (115). The video buffer (120) acts as a queue. Items in the queue can be retrieved in a first in first out manner or first in last out manner. A retrieved element can be deleted when retrieved or not. Any queuing mechanism can be used based on the requirements of a specific implementation of an embodiment of the present invention.

The player (130) pulls video frames from the video buffer (120), decodes them and renders them as a video. The command handler (125) receives keyboard events from the keyboard (140) and interprets them to send commands to the network personal video server (105), the RTSP video source (115), the broadcast video source (110) and the video buffer (120). The command handler (125) can get messages or events from the network personal video server (105).

The portable computing system (100) is a mobile device wirelessly connected to a network and suitable for rendering videos to a user. The video data is received from a broadcast server (103) or from the network personal video server (105). The network personal video server (105) comprises storage space reserved for the needs of the portable computing system (100). This storage space can be located in one or several storage facilities. The network personal video server (105) has network access to the broadcasted video frames. The network personal video server (105) allows time-based access to files. It can deliver a stream of video frames in response to commands received from the network. Such commands can be in the form of messages or requests. They can comprise a play command, to cause one or several media streams to be played; a pause command, to temporarily halt one or several media streams, which can be resumed later by a play request; a record command to indicate a stream to the server for storage; and a stop or teardown request or message to terminate the session and halt one or several media streams. The RTSP protocol is a commonly used protocol to implement the commands. The media stream itself can be delivered for example via the Real-time Transfer Protocol (RTP). The video frames are stored locally in the portable computing system (100) in the video buffer (120). This enables a smoother video rendering whereas the network traffic can be very irregular, especially with wireless network connections. The video frames can be encoded using any video encoding scheme, such as MPEG4 or H.264.

The command handler (125) dispatches commands to the different components of the system. It can also monitor their states or receive events from them to take appropriate actions. The portable computing system (100) contains functions to receive broadcast television using DVB-H or T-DMB. Received TV channel images fill the video buffer (120), which is used by an H.264 decoder to decompress received images and pass them to the player (130). The keyboard (140) is used to send user directives to the command handler (125). These directives can be: Start playing a video channel; Stop playing a video channel (zapping from one channel to another one requires first to Stop initial channel, then Start the new channel); Pause, which freezes the image on the screen (for example during a phone call), but continues to fill the video buffer with the received images of the selected TV channel; Play is used to restart playing after a <<Pause>>, in this case, the system according to an embodiment of the invention will play the video in a time shifted mode, to restart from where the video paused, this command has no effect during normal reception of a TV channel and is ignored if generated by a user; and Fast Forward allows to play a recorded channel with a higher speed, such as ×4, ×6, ×8, or any other speed. In Fast Forward mode all recorded video images are consumed, the terminal is automatically switched in normal mode and the selected TV channel is played synchronously. A Play command during a Fast Forward mode restarts playing of recorded channel at a normal speed, while <<Pause>> freezes the image on the screen.

The keyboard (140) is used as a user input device. Alternatively, this input device can be a mouse, voice recognition system, touch screen, or any device with which a user can interact.

Figure 2:
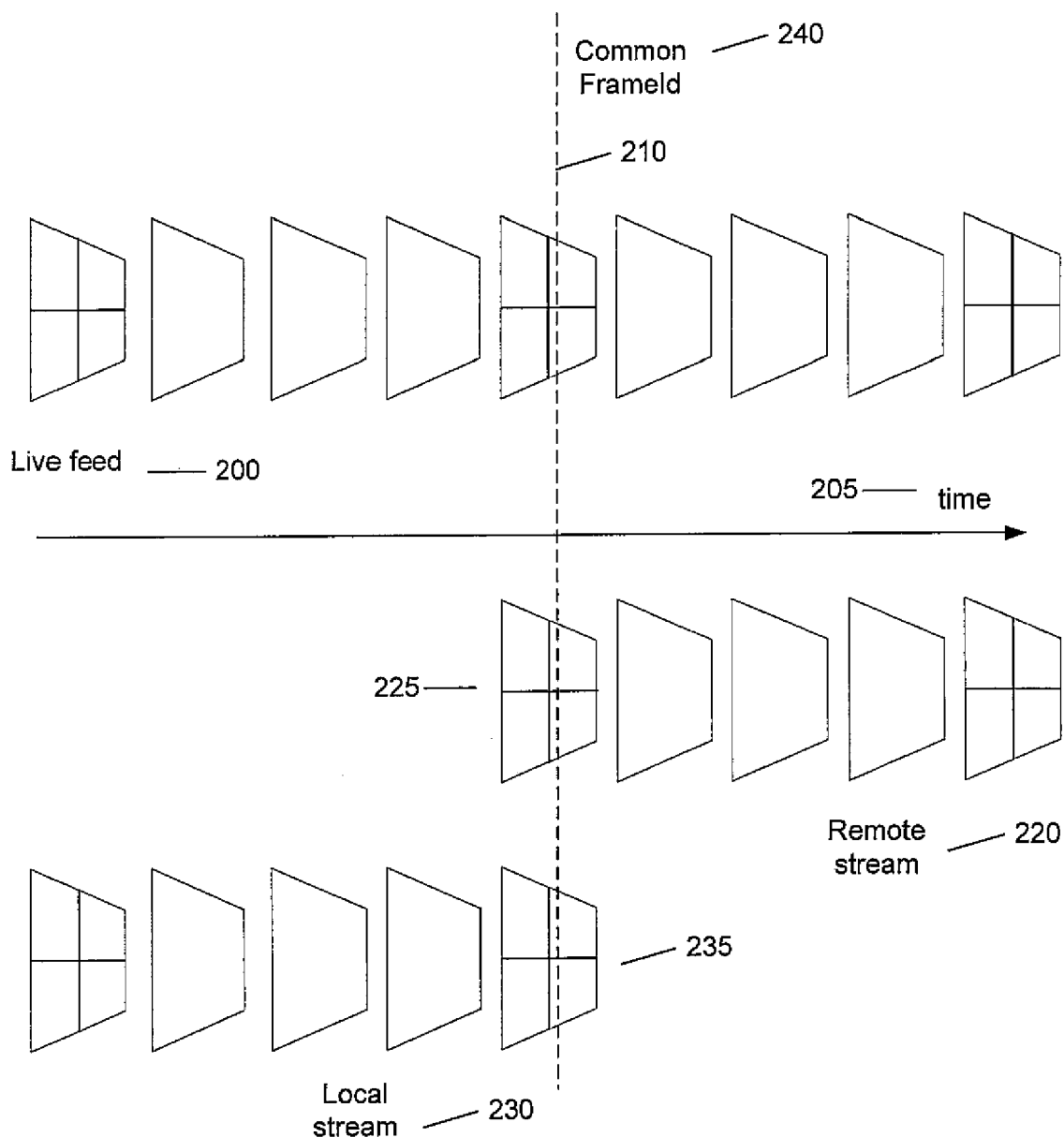
FIG. 2 shows several sequences of video frames, running in different streams, in an implementation of the present invention.

FIG. 2 shows several sequences of video frames, running in different streams, comprising: a live feed (200) or a broadcast stream, broadcasted by the broadcast server (103); a remote stream (220), streamed by the network personal video server (105); and a local stream (230), streamed out of the video buffer (120). All streams comprise a sequence of video frames. Each video frame is associated with a frame identifier, or frame id. This id is used to uniquely identify a particular video frame. It is typically a numerical value. For any video frame in the local stream (230) or in the remote stream (220) there is a corresponding video frame in the live feed (200) with the same frame id, as both the remote stream (220) and the local stream (230) are copied from the broadcast stream. According to an embodiment of the invention, the portable computing system (100) switches from the local stream (230) to the remote stream (220) when playing a video in a time shifted mode. The last video frame in the local video buffer (120) shares a common frame id (240) with the first frame in the remote stream (220) streamed by the network personal video server (105). The values of the ids of successive video frames can be set as a function of time (205). A typical function is to increment the frame id by 1 for successive video frames. The video frames can be I, P or S frames, according to the chosen encoding format.

Figure 3:
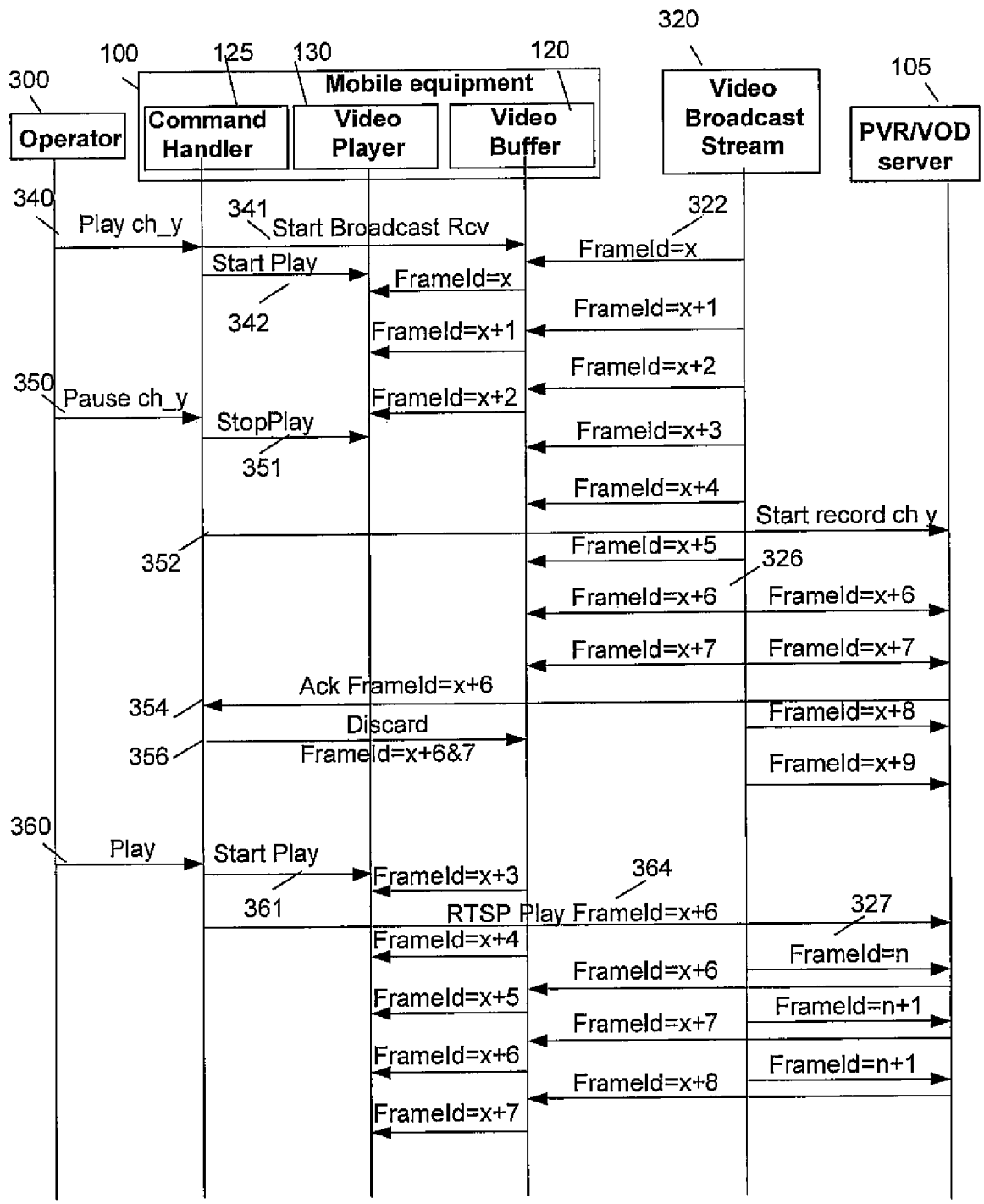
FIG. 3 shows a flow of messages exchanged between different components comprised in an implementation of the present invention.

FIG. 3 shows a flow of messages exchanged between different components in an implementation of the present invention. FIG. 3 depicts: an operator (300) sending directives; the portable computing system (100) or mobile equipment; the command handler (125); the player (130); the video buffer (120); a video broadcast stream (320) sent by the broadcast server (103); and the network personal video server (105) also called personal video recorder (PVR) or video on demand (VOD) server.

The operator (300) can send the following directives to the command handler (125) by means of a user input device (such as the keyboard (140)): play ch_y (340) for playing channel y; pause ch_y (350) for halting temporarily the playing of channel y; and play (360) for resuming the playing of selected channel, here channel y.

The video broadcast stream (320) comprises video frames (322, 326, 327) with frame id x (322), x+6 (326) and n (327) and following.

The command handler (125) sends the following commands: start broadcast receive (341) to the broadcast video source (110) which stores the broadcasted frames or live feed (200) in the video buffer (120); start play (342) and stop play (351) to the player (130); start record channel (352) to the network personal video server (105), to instruct the network personal video server (105) to record a particular channel, here channel y; discard frame (356) sent to the video buffer (120) to instruct it to discard from its storage the video frames with the specified frame ids, here frames with frame ids x+6 and x+7. (The command handler (125) also instructs the broadcast video source (110) to disconnect from the broadcast stream (320)); and RTSP play frame id (364) sent to the network personal video server (105) to instruct it to stream video frames with frame ids having a value greater than or equal to the instructed value, here x+6.

The command handler (125) receives a message from the network personal video server (105): ack frame id (354) to acknowledge that the video frame with the specified frame id (here x+6) has been correctly recorded from the live feed (200).

The video buffer (120) receives video frames from the broadcast server (103) via the broadcast video source (110) and from the network personal video server (105) via the RTSP video source (115). The command handler (125) instructs the video buffer (120) from which source it should store the video frames. When the video buffer (120) receives from the command handler (125) a discard frame (356) command, it removes the video frame with the specified frame id (here x+6 and x+7) from its memory and stops recording video frames from the broadcast video source (110).

The network personal video server (105) can receive several commands from the command handler (125). Upon receipt of the start record channel (352) command, the network personal video server (105) connects to the specified live feed (200) and starts recording the streamed video frames. After a video frame is successfully recorded, the network personal video server (105) sends the frame id of this video frame to the command handler (125) via the ack frame id (354) message. Upon receipt of the RTSP play frame id (364) command, the network personal video server (105) streams video frames, starting from the specified frame id, which is in general the same as the acknowledged one in message (354) but can be different (for example in the case of a play fast forward command, the network personal video server (105) can start streaming a later frame).

In response to a pause event, the portable computing system (100) shifts from the broadcast video stream to the stream of the network personal video server (105). This shifting is triggered when a broadcast video is playing and a pause event is detected, either because the operator (300) instructed it or because a phone call is received which makes it impossible for the operator (300) to continue watching the video. There is a delay between the moment when the video is paused on the portable computing system (100) and the moment when the network personal video server (105) starts recording from the broadcast stream (320). In an embodiment of the present invention, the frames broadcasted during that delay are stored in the local video buffer (120) so that no video frames are missing when a play (360) command is again instructed, in a time shift play mode.

The flow of exchanged messages and commands enable the system to capture and deliver to the player (130) all the successive video frames broadcasted in the live feed (200), even those broadcasted during pause or time shift play mode. When playing video in a time shift mode, the video frames are streamed by the network personal video server (105) and are received via the RTSP video source (115). They are then copied to the video buffer (120). The network personal video server (105) keeps on recording the video frames from the broadcast stream unless instructed otherwise.

Figure 4:
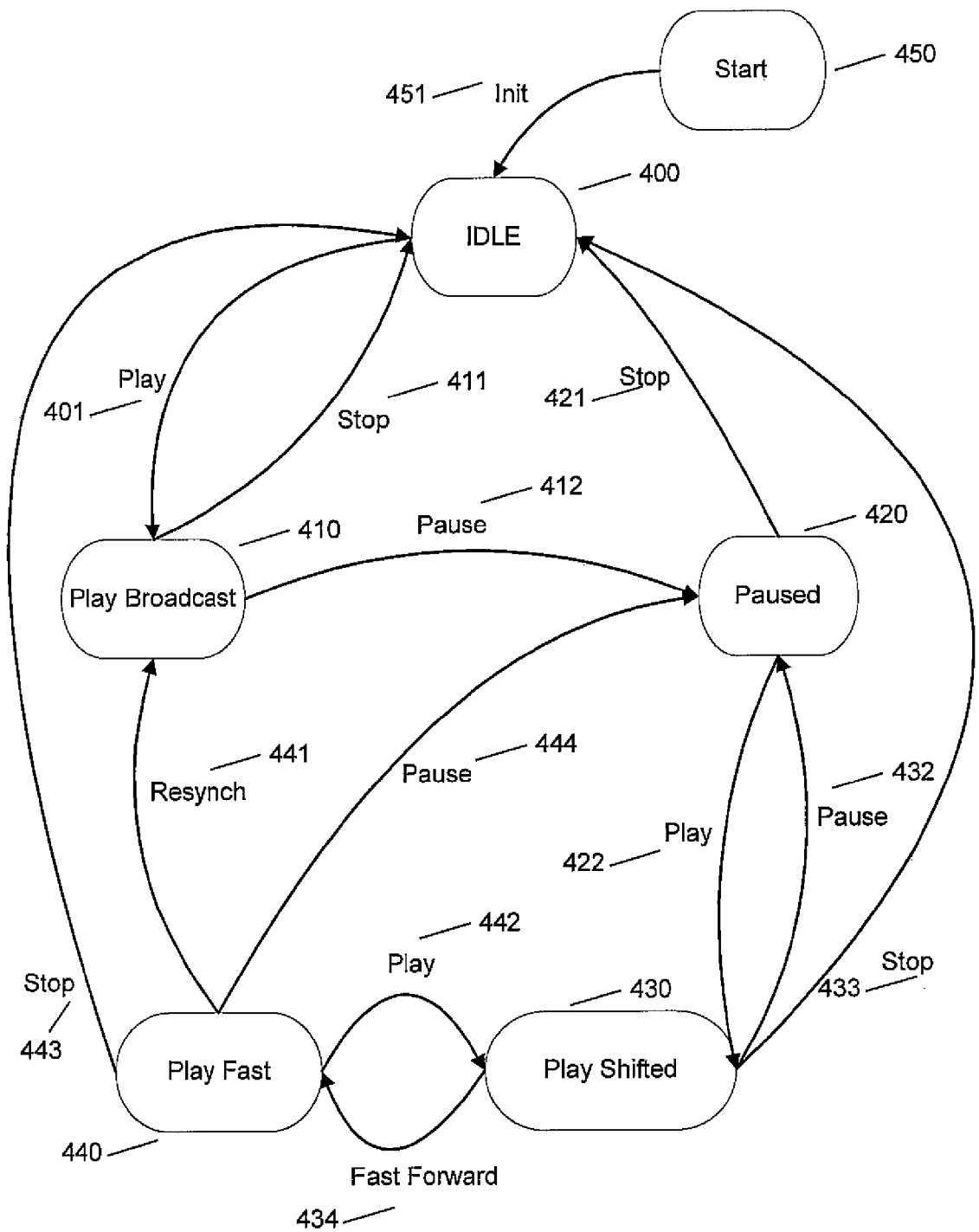
FIG. 4 shows a finite state machine associated with an implementation of the present invention.

FIG. 4 shows a finite state machine associated with an implementation of the present invention, the finite state machine comprising: an idle state (400) during which the portable computing system (100) stays idle until a TV channel is selected for playing (401); a play broadcast state (410) which is the status during the playing of a broadcasted video, or synchronous TV channel play; a paused state (420), which is the status after a pause command is received by the command handler (125), in that state the broadcast video stream is recorded, in the video buffer (120), in the network personal video server (105), or both; a play shifted state (430), which corresponds to the playing of a recorded live feed (200) (time shift mode); a play fast state (440), which corresponds to the playing of a recorded live feed (200) (time shift mode) in a fast forward manner; and a start state (450), in which the system is when powered on.

When the system is in the idle state (400) and a play command (401) is received, the system goes into the play broadcast state (410). When the system is in the play broadcast state (410) and a stop command (411) is received, the system goes into the idle state (400). When the system is in the play broadcast state (410) and a pause command (412) is received, the system goes into the paused state (420).

When the system is in the paused state (420) and a stop command (421) is received, the system goes into the idle state (400). When the system is in the paused state (420) and a play command (422) is received, the system goes into the play shifted state (430).

When the system is in the play shifted state (430) and a pause command (432) is received, the system goes into the paused state (420). When the system is in the play shifted state (430) and a stop command (433) is received, the system goes into the idle state (400). When the system is in the play shifted state (430) and a fast forward command (434) is received, the system goes into the play fast state (440).

When the system is in the play fast state (440) and a play command (442) is received, the system goes into the play shifted state (430). When the system is in the play fast state (440) and a stop command (443) is received, the system goes into the idle state (400). When the system is in the play fast state (440) and a resynch command (441) is received, the system goes into the play broadcast state (410). The resynch command instructs the system to resynchronize with the broadcast stream and start playing a broadcasted channel in a synchronous mode. When the system is in the play fast state (440) and a pause command (444) is received, the system goes into the paused state (420).

When powered on, the portable computing system (100) is into the start state (450). It executes the init action (451) to go into the idle state (400).

The Play command (401) starts the playing of the selected channel. The stop command (411) interrupts the TV playing. The pause command (412) freezes the TV images and start TV channel recording. The stop command (421) interrupts the TV recording, cleans all involved buffer. The play command (422) restarts the video playing at the interrupted image or video frame. The pause command (432) freezes the TV images and continues the TV channel recording. The stop command (433) interrupts the TV playing and recording, cleans all involved buffer. The fast forward command (434) plays the recorded video with an accelerated speed. The resynch command (441) is generated either by the network personal video server (105) or internally when all images stored in the video buffer or in the network personal video server (105) have been consumed by the video player. The command handler (125) then instructs the portable computing system (100) to restart synchronous TV channel playing. The play command (442) restarts video playing in time shift at the interrupted image or video frame. The stop command (443) interrupts the TV recording and cleans all involved buffer. The pause command (444) freezes the TV images as the TV channel recording continues.

Figure 5:
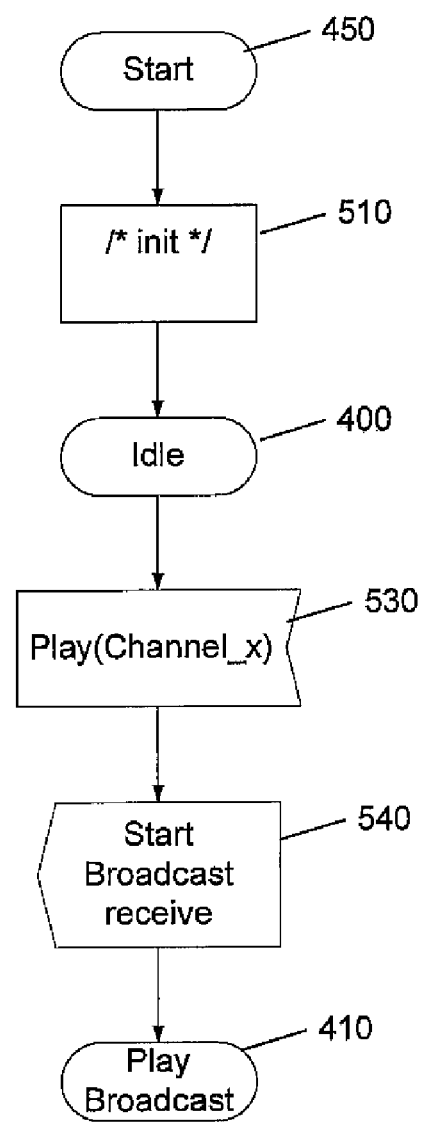
FIG. 5 shows a process with the main steps for playing broadcasted video frames, in an implementation of the present invention.

FIG. 5 shows a process with the main steps for playing broadcasted video frames, comprising: the start state (450); an init step (510); the idle state (400); a play channel_x step (530) initiated by the receipt of an instruction for playing the channel_x; a start broadcast receive step (540) which comprises the generation of an event indicating that the reception of broadcasted video frames has started; and the play broadcast state (410).

During the init step (510) the reception protocol of broadcasted TV is initialized: DVB-H or T-DMB and Electronic Service Guide is received, allowing the display and the selection of the available channels. Then the portable computing system (100) is set the idle state (400) to wait for a channel selection. The play channel_x step (530) is initiated by the selection of channel x and by pressing the key associated to the play command. The start broadcast receive step (540) fills the video buffer with video frame received from the selected channel. Finally the portable computing system (100) goes into the play broadcast state (410).

Figure 6:
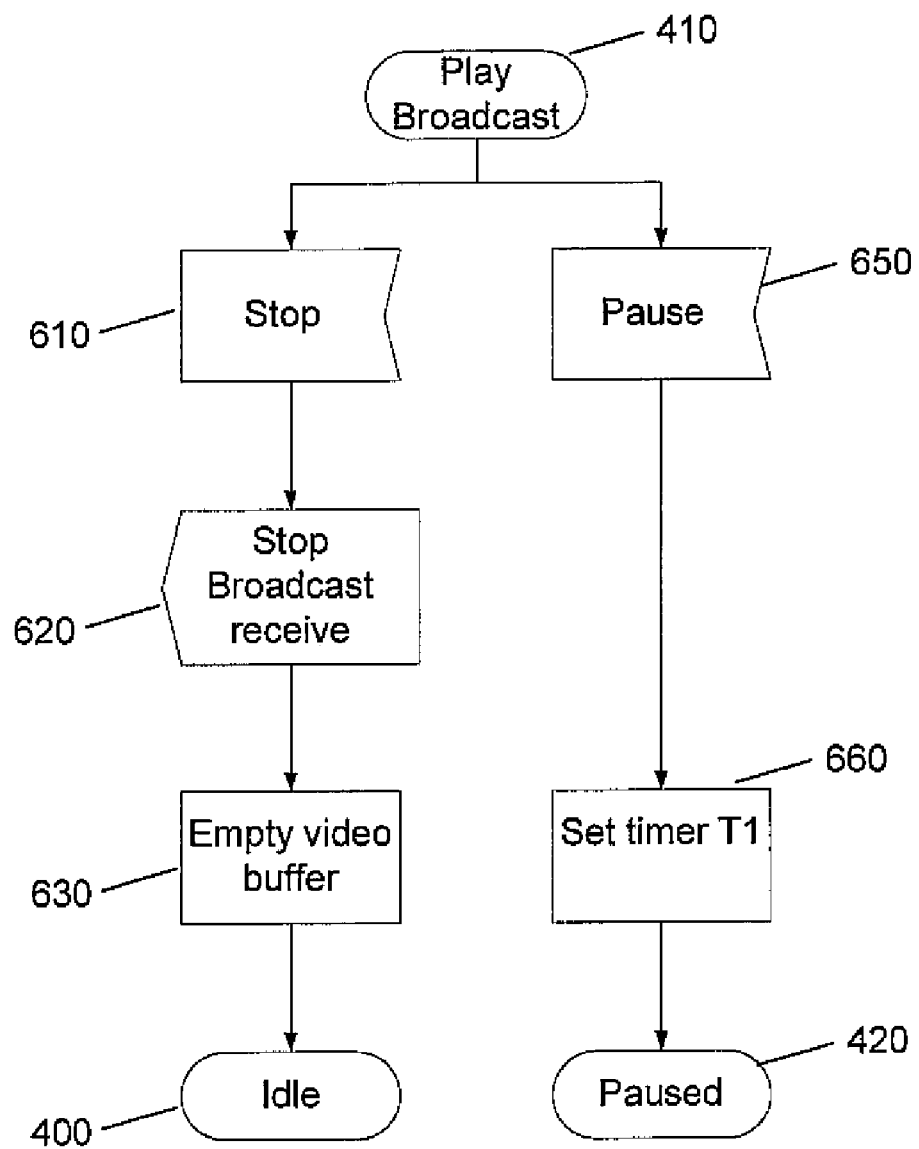
FIG. 6 shows a process with the main steps for stopping or pausing the playing of broadcasted video frames, in an implementation of the present invention.

FIG. 6 shows a process with the main steps for stopping or pausing the playing of broadcasted video frames, comprising: the play broadcast state (410); a stop step (610) initiated by the reception of a stop command or the detection of a stop event; a stop broadcast receive step (620) which comprises the generation of an event indicating that the reception of broadcasted video frames has stopped; an empty video buffer step (630); the idle state (400); a pause step (650) initiated by the reception of a pause command or the detection of a pause event; a set timer T1 step (660); and the paused state (420).

While in the play broadcast state (410), two events may be received: a stop event triggering the stop step (610) which stops filling the video buffer from previously selected channel (620). The video buffer (120) is then flushed (630). Finally the mobile terminal is set in the idle state (400); and a pause event triggering the pause step (650) which freezes the TV images and starts the TV channel recording. Then the timer T1 is activated (660) to periodically control the filling level of the video buffer (120) and to check if a predetermined threshold is reached. The portable computing system (100) goes then into the paused state (420).

Figure 7:
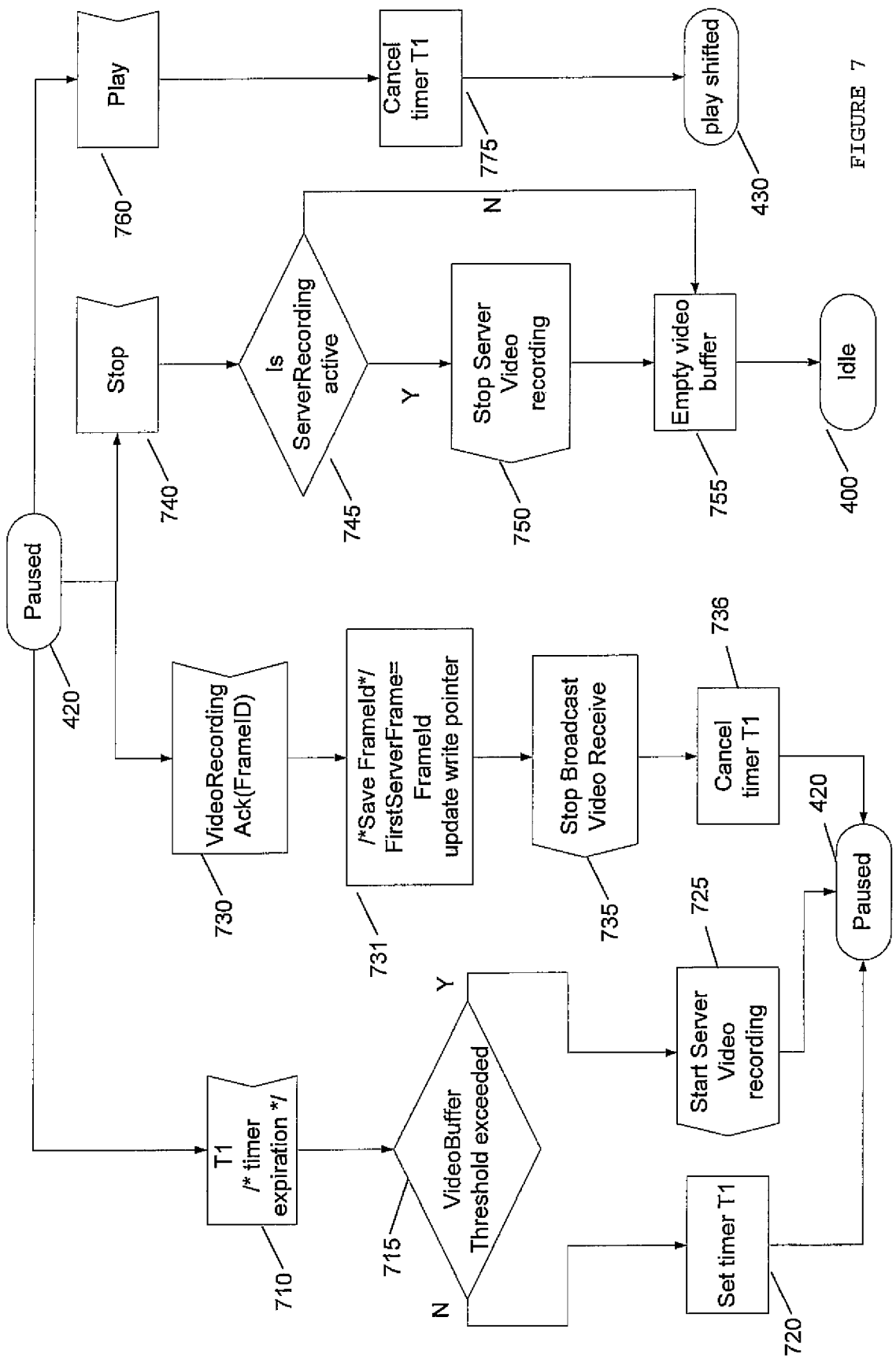
FIG. 7 shows a process with the main steps for the recording of the broadcasted video frames during the paused state, in an implementation of the present invention.

FIG. 7 shows a process with the main steps for the recording of the broadcasted video frames during the paused state, comprising: the paused state (420); a timer expiration step (710) corresponding to the detection of the event that the timer T1 has expired; a video buffer threshold exceeded step (715) checking the load of the video buffer (120); a set timer T1 step (720); a start server video recording step (725); a video frame id recording acknowledge step (730) initiated by the reception by the command handler (125) of an event or message indicating that the network personal video server (105) has successfully recorded a video frame with the indicated frame id; a save frame id step (731) to update the portable computing system (100); a stop broadcast video receive step (735) which comprises the generation of an event indicating that the reception of broadcasted video frames has stopped; a cancel timer T1 step (736); a stop step (740) triggered by the reception of a stop command (421); a step in which it is checked whether the server recording is active (745); a step to stop the server video recording (750); a step to empty the video buffer (755); the idle state (400); a play step (760) triggered by the detection of a play command (422); a cancel timer T1 step (775); and the play shifted state (430).

While in the paused state (420), four events can be received. One event is a timer expiration in which the timer T1 has expired (710) indicating that the video buffer (120) load must checked against a predefined threshold (715). If the threshold is exceeded, a command (352) is sent to the network personal video server (105) to start video recording (725). If the load is still below the threshold, the timer T1 is set (720) so that the same check is performed when T1 expires again. The system stays in the paused state (420).

Another event comprises an event (730) corresponding to the recording of a video frame by the network personal video server (105) upon receipt of the start recording request (352). The first server frame id is saved locally and all frames having an id equal to or greater than the first server frame id are discarded (731) from the video buffer (120). A command to stop the reception of broadcasted video is sent (735) and the timer T1 is cancelled (736) as the video buffer (120) is no more filled with broadcasted video frames. The system stays in the paused state (420).

Another event comprises a stop event (740) corresponding to the firing of a stop command (411). The command handler (125) then checks whether the server recording is active (745). If it is, the command handler (125) stops it (750) and empties the video buffer (755). If it is not, then the command handler (125) directly empties the video buffer (755). Alternatively the step (755) of emptying the video buffer (120) can be avoided if one wants to keep the possibility to play the recorded video frames later. The system then goes into the idle state (400).

Another event is a play event (760) triggered by the firing of a play command (422). The command handler (125) then cancels the timer (775) because the buffer is read as the same speed as it is filled. The system then goes into the play shifted state (430).

Figure 8:
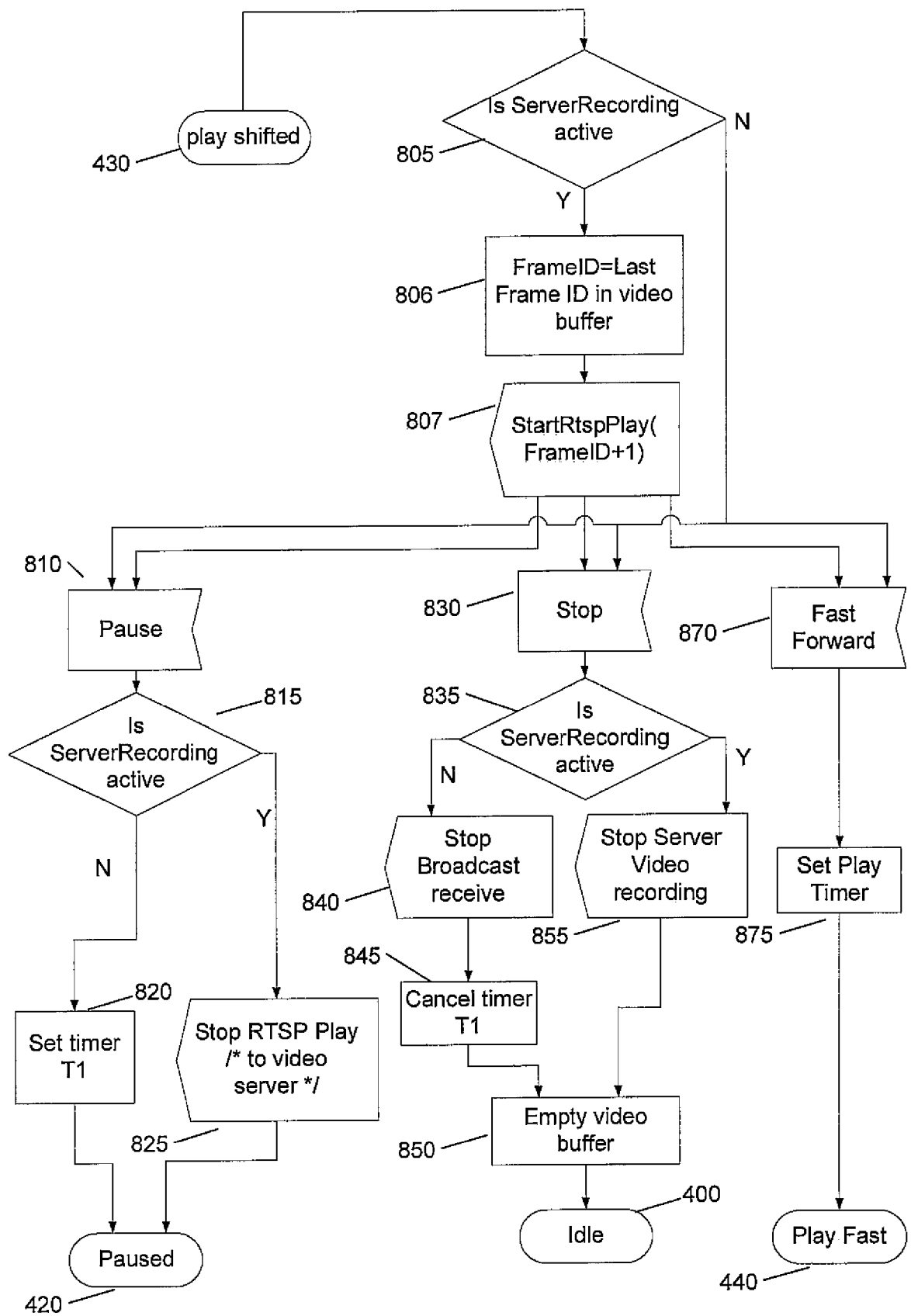
FIG. 8 shows a process with the main steps for playing video frames in a time shifted mode, in an implementation of the present invention.

FIG. 8 shows a process with the main steps for playing video frames in a time shifted mode, comprising: the play shifted state (430); a decision step to check if the server recording is active (805); a step (806) to store the id of the last video frame in the video buffer (120); a step to instruct the network personal video server (105) so start streaming video frames with an identifier greater than the instructed frame id (807); a pause step (810) triggered by the detection of a pause event; the decision step to check whether the server recording is active (815); a step to set the timer T1 (820) at a specified time value; a step to instruct the network personal video server (105) to halt the streaming of video frames (825), which can be implemented as an RTSP Stop command; a stop step (830) triggered by the firing of a stop command (433); the decision step to check whether the server recording is active (835); a stop broadcast video receive step (840) which comprises the generation of an event indicating that the reception of broadcasted video frames has stopped; a cancel timer T1 step (845); a step to stop the server video recording (855); a step to empty the video buffer (850); the idle state (400); a fast forward step (870) in response to the detection of a fast forward command (434); a set play timer step (875); and the play fast state (440).

After the system enters the play shifted state (430), a check is performed to determine if the server recording is active (805). If the server recording has not started, the process waits for a new event while the video player is running. The verification of the video buffer load is not necessary because the rate for playing video frame is the same as the rate for receiving video frames. If these rates are different, synchronization techniques are available to keep both streams synchronized. If the server recording has started, a local variable FrameId is initialized (806) with the value of the identifier of the last video frame in the video buffer (120) and a RTSP play command for starting streaming video frames with a frame identifier greater than or equal to the FrameId+1 is sent (807) to the network personal video server (105). Then the process waits for a new event while the video player is running.

Three events can be received at this point: a pause event, a stop event, or a fast forward event.

The pause event (810) is triggered by the firing of a pause command (432) by the operator (300) or because of another system event, such as the receipt of a phone call, of a text or multimedia message, of a shock to the portable computing system (100), etc. The system then checks if the server recording is active (815). If the server recording is active a command RTSP Stop is sent (825) to the network personal video server (105). If not the timer T1 is set (820) to enable the verification of the video buffer (120) load. In both cases the system goes into the paused state (420) afterwards.

The stop event (830) is triggered by the firing of a stop command (433). If the server recording is active (835) a command Stop recording is sent (855) to the network personal video server (105). If not the reception of broadcasted video frames is stopped (840) and the timer T1 is cancelled (845). In both cases the video buffer is then emptied (850) and the system goes into the idle state (400).

The fast forward event (870) is triggered by the fast forward command (434). The play timer is set (875) with a time value corresponding to the interframe time. The system goes into the play fast state (440).

Figure 9:
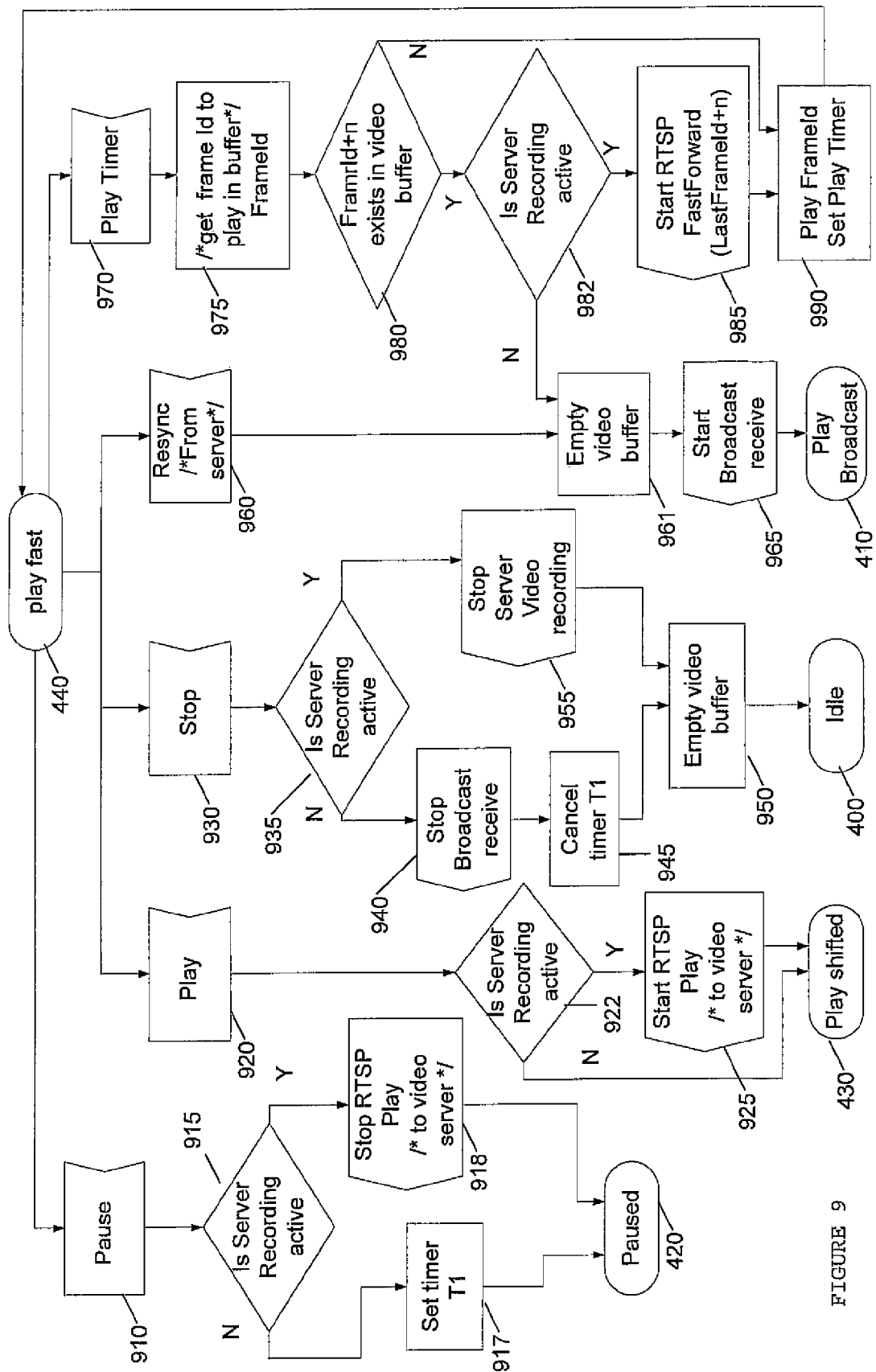
FIG. 9 shows a process with the main steps for playing video frames in a fast forward mode, in an implementation of the present invention.

FIG. 9 shows a process with the main steps for playing video frames in a fast forward mode, comprising: the play fast state (440); a pause step (910) triggered by the detection of a pause event; the decision step to check whether the server recording is active (915); a step to set the timer T1 (917) at a specified time value; a step to instruct the network personal video server (105) to halt the streaming of video frames (918), which can be implemented as an RTSP Stop command; a play step (920) triggered by the detection of a play event; the decision step to check whether the server recording is active (922); a step to instruct the network personal video server (105) to start the streaming of video frames (925), which can be implemented as an RTSP Play command; a stop step (930) triggered by the firing of a stop command (443); a decision step to check whether the server recording is active (935); a stop broadcast video receive step (940) which comprises the generation of an event indicating that the reception of broadcasted video frames has stopped; a cancel timer T1 step (945); a step to stop the server video recording (955); a step to empty the video buffer (950); the idle state (400); a resynch step (960) triggered by an internal system event or by the network personal video server (105); an empty video buffer step (961); a start broadcast receive step (965); the play broadcast state (410); a play timer step (970), triggered by the expiration of the play timer previously set (875); a step to lookup the value of the local variable (975) containing the identifier value of the last video frame in the video buffer (120); a decision step (980) to check whether the next frame to be played by the player (130) in the fast forward mode is available in the video buffer (120); a decision step to check whether the server recording is active (982); a start RTSP FastForward step (985) which generates a message instructing the network personal video server (105) to stream video frames in a fast forward mode, starting at the indicated frame id; and a step for playing the video frames stored in the video buffer (120), starting with the video frame with the instructed frame identifier and for setting the play timer (990).

When the system is in the play fast state (440), it can receive five events: a pause event, a play event, a stop event, a resynch event, and a play timer event.

The pause event (910) is triggered by the firing of a pause command (444). The system then checks if the server recording is active (915). If the server recording is active a command RTSP Stop is sent (918) to the network personal video server (105). If not the timer T1 is set (917) to enable the verification of the video buffer (120) load. In both cases the system goes into the paused state (420) afterwards.

The play event (920) is triggered by the firing of a play command (442). The system then checks if the server recording is active (922). If the server recording is active a command RTSP Play is sent (925) to the network personal video server (105). Then the system goes into the play shifted state (430). It goes directly in the play shifted state (430) if the server recording is inactive.

The stop event (930) is triggered by the firing of a stop command (433). If the server recording is active (935) a command Stop recording is sent (955) to the network personal video server (105). If not the reception of broadcasted video frames is stopped (940) and the timer T1 is cancelled (945). In both cases the video buffer is then emptied (950) and the system goes into the idle state (400).

The resynch event (960) is sent by the network personal video server (105) when the next video frames streamed in the fast forward mode is synchronous with the video frames broadcasted by the broadcast server (103). Then the video buffer (120) is emptied (961) and a start broadcast receive command is sent (965) to fill the video buffer (120) with the received broadcasted frames. The system then goes into the play broadcast state (410).

The play timer event (970) is triggered to check whether the video frames either in the local video buffer (120) or in the remote storage managed by the network personal video server (105) is exhausted. On expiration of the play timer (970), the video frame to be played is extracted from the video buffer (120) and a local variable is initialised with the frame identifier (FrameId) of the last video frame in the video buffer (120). A check is performed (980) to verify the availability in the video buffer (120) of the next frame to be played with a frame identifier equal to FrameId+n, where "n" is the number of frames to be skipped in fast forward multiplied by an anticipation factor. If FrameId+n is in the video buffer (120), the video frame with a frame identifier FrameID is played and Play timer is reinitialized (990), the system staying in the play fast state (440). If FrameId+n is not in the video buffer (120) and if server recording is active (980), a start RTSP FastForward starting at frame FrameId+n is sent (985) to the video server, then the previously extracted FrameID is played and Play timer is reinitialized (990). If FrameId+n is not in the buffer and if server recording is not active, it means that the fast forward is now synchronous with the broadcasted video stream. Then the video buffer (120) is emptied (961) and a start broadcast receive is sent (965) to fill the video buffer (120) with the received broadcasted video frames. The system state is then set to the play broadcast state (410).

Another embodiment comprises a method for automatically switching from a local storage to a remote storage for recording a broadcast video stream, the switching being triggered by the fact that the local storage is almost full, and a method for automatically switching from a local storage to a remote storage for playing a broadcast video stream in a delayed manner, the switching being triggered by the fact that the video frames in the local storage are exhausted or almost exhausted. On mobile phones, it is possible to perform Time Shift TV with content stored on SIM card in one hand, or on SD card on the other hand. This function is very useful, in particular when a user is looking at the TV on his Mobile then has a call. But the size of the SIM card (65 MB, 256 MB) or of the SD is limited. More, the size of the file corresponding to a video, at 500 Kb/s stored during 5 minutes is 20 MB. Content may be stored locally on a SIM card or on a SD card using a personal video recorder. Content may be stored in server in the network as a network personal video server (nPVR). But, there is no method or system to swap from one system of recording to another easily and without an action from the user. The solution is to extend the video player with a new application layer component: a Dynamic TimeShift Handler (DTS). This component manages dynamically the video player buffer while time shifting from various sources (local, BroadCast, or from the nPVR). It is thus possible to manage dynamic time shift video playing on storage limited devices.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer device or any instruction execution system. For the purposes of this description, a computer-usable or computer readable storage medium can be any apparatus that can contain, store, or transport the program for use by or in connection with the instruction execution system, apparatus, or device.

The medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing or computer system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the invention has been presented for purposes of illustration and description. It is not intended to be exhaustive or to limit the invention to the precise form disclosed, and many modifications and variations are possible. Such modifications and variations are intended to be included within the scope of this invention as defined by the accompanying claims.

The invention claimed is:

1. A method for playing video frames, each of the frames being associated with a numeric identifier, comprising:
   receiving an input stream of a plurality of video frames from a broadcast server, the plurality of video frames including a first frame associated with a first identifier;
   storing the plurality of video frames including the first frame in a first queue;
   playing the plurality of video frames by dequeuing the plurality of video frames from the first queue;

detecting a first event when the dequeuing of video frames from the first queue is halted;

detecting a second event when the first queue load is above a first predefined threshold;

sending a first message to an output message handler, the first message instructing the recording of the video frames from the broadcast server in a second external queue, the second external queue being hosted on an external server;

receiving a second message indicating that a second frame associated with a second identifier has been stored in the second external queue;

detecting a third event when dequeuing of video frames from the first queue has started; and sending a third message to the output message handler instructing the external server to stream the previously recorded video frames.

2. The method of claim 1, wherein, at the step of sending a third message, the video frames sent by the external server are associated with a further identifier having a numeric value greater than or equal to the numeric value of the second identifier.

3. The method of claim 1, further comprising, after the step of receiving a second message, the step of discarding the video frames whose associated identifier has a numeric value greater than or equal to the numeric value of the second identifier.

4. The method of claim 1, further comprising the step of receiving a third frame associated with a third identifier from the second input stream.

5. The method of claim 1, further comprising: after the step of detecting a third event, the step of detecting a fourth event when the first queue load is below a second predefined threshold.

6. An apparatus for playing video frames, each of the frames being associated with a numeric identifier, comprising:
  a computer device, including:
  a component for receiving an input stream of a plurality of video frames from a broadcast server, the plurality of video frames including a first frame associated with a first identifier;
  a component for storing the plurality of video frames including the first frame in a first queue;
  a component for playing the plurality of video frames by dequeuing the plurality of video frames from the first queue;
  a component for detecting a first event when the dequeuing of video frames from the first queue is halted;
  a component for detecting a second event when the first queue load is above a first predefined threshold;
  a component for sending a first message to an output message handler, the first message instructing the recording of the video frames from the broadcast server in a second external queue, the second external queue being hosted on an external server;
  a component for receiving a second message indicating that a second frame associated with a second identifier has been stored in the second external queue;
  a component for detecting a third event when dequeuing of video frames from the first queue has started; and
  a component for sending a third message to the output message handler instructing the external server to stream the previously recorded video frames.

7. A computer program product stored on a non-transitory computer readable storage medium and loadable into the internal memory of a computing device, comprising software code portions for performing, when said product is run on a computer, a method comprising:
  receiving an input stream of a plurality of video frames from a broadcast server, the plurality of video frames including a first frame associated with a first identifier;
  storing the plurality of video frames including the first frame in a first queue;
  playing the plurality of video frames by dequeuing the plurality of video frames from the first queue;
  detecting a first event when the dequeuing of video frames from the first queue is halted;
  detecting a second event when the first queue load is above a first predefined threshold;
  sending a first message to an output message handler, the first message instructing the recording of the video frames from the broadcast server in a second external queue, the second external queue being hosted on an external server;
  receiving a second message indicating that a second frame associated with a second identifier has been stored in the second external queue;
  detecting a third event when dequeuing of video frames from the first queue has started; and
  sending a third message to the output message handler instructing the external server to stream the previously recorded video frames.

* * * * *